United States Patent [19]

Kolkhorst, deceased et al.

[11] 4,057,182
[45] Nov. 8, 1977

[54] MOTORCYCLE CARRIERS

[76] Inventors: Lee R. Kolkhorst, deceased, late of Paradise, Calif.; by Virginia E. Kolkhorst, executrix, 1362 Kerr Lane, Paradise, Calif. 95969

[21] Appl. No.: 595,640

[22] Filed: July 14, 1975

[51] Int. Cl.² .......................... B60R 7/02; B60R 9/10
[52] U.S. Cl. ........................ 224/42.45 R; 105/367; 211/18
[58] Field of Search ............... 224/42.03 B, 42.45 R, 224/29 R, 42.46 R, 42.42 R, 42.43, 42.44; 211/17, 18, 19, 20, 21, 22; 280/150 R, 179; 248/287, 286, 285, 124, 304; 105/367, 368 R

[56] References Cited

U.S. PATENT DOCUMENTS

| 594,627 | 11/1897 | Hewlett | 211/22 |
|---|---|---|---|
| 653,386 | 7/1900 | Hunter | 211/19 |
| 3,656,670 | 4/1972 | Hill | 224/42.03 B X |
| 3,785,517 | 1/1974 | Brajkovich | 214/450 |

FOREIGN PATENT DOCUMENTS

| 1,127,765 | 12/1956 | France | 211/17 |
|---|---|---|---|
| 285,977 | 1/1953 | Switzerland | 211/18 |
| 30,199 of | 1898 | United Kingdom | 211/18 |

*Primary Examiner*—Robert J. Spar
*Assistant Examiner*—Jerold M. Forsberg
*Attorney, Agent, or Firm*—Townsend and Townsend

[57] ABSTRACT

Apparatus for restricting the motion of a motorcycle while it is being carried by a pickup truck or similar vehicle is disclosed. Such vehicles are of the type having a bed which includes a horizontal load-bearing portion and one or more sidewall portions. The motorcycle is provided with a luggage rack or similar rear-mounted load carrying member. The apparatus of the present invention provides a substantially vertical strut mounted to the vehicle bed proximate one of its sidewalls. A transverse hook member is attached to the top of the vertical strut. The free end of the hook member has an upwardly opening hook contour. The rear portion of the motorcycle is lifted and the rear-mounted load carrying member engaged with the hook contour along the side of the motorcycle near the strut. The rear wheel of the motorcycle is thus maintained in a raised position relative to the horizontal portion of the vehicle bed, and the lower extremity of the rear wheel is biased against the vertical strut. The front wheel of the motorcycle is turned against a sidewall portion of the vehicle bed and locked in position and movement of the motorcycle is prevented as it is being carried by the vehicle.

1 Claim, 4 Drawing Figures

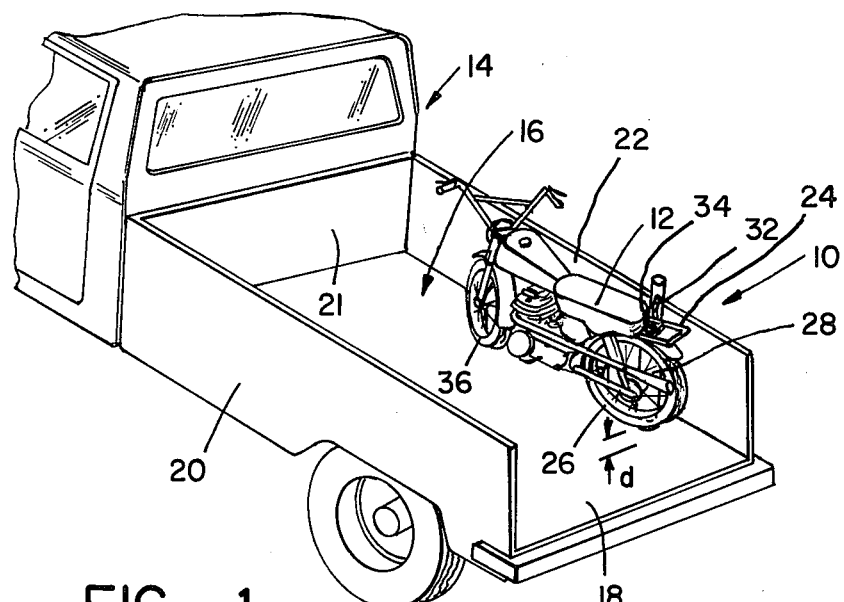
FIG_1
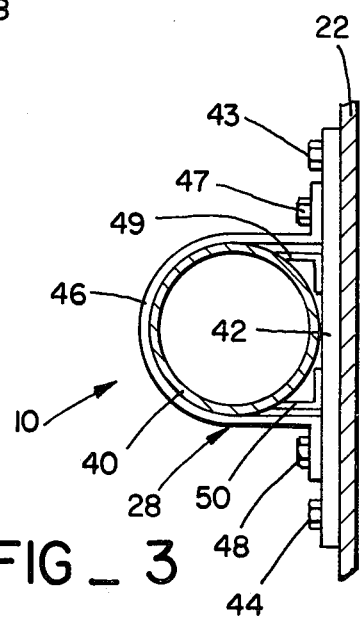
FIG_3
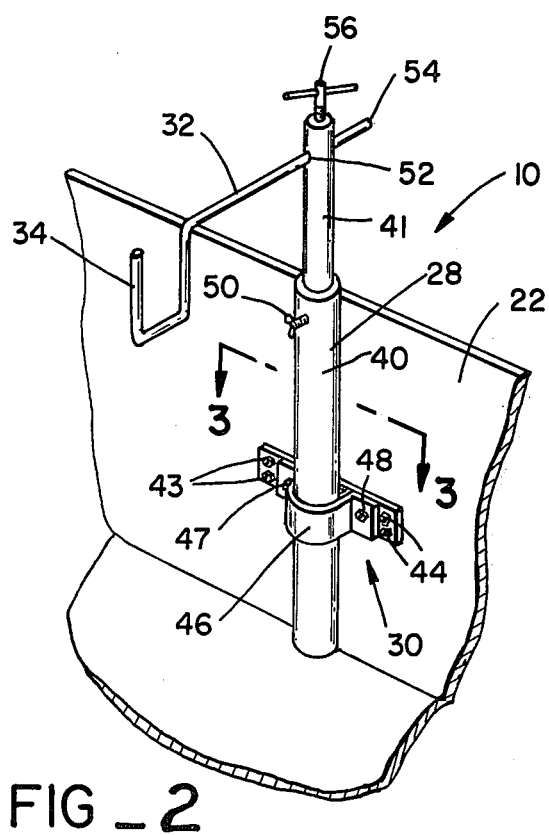
FIG_2
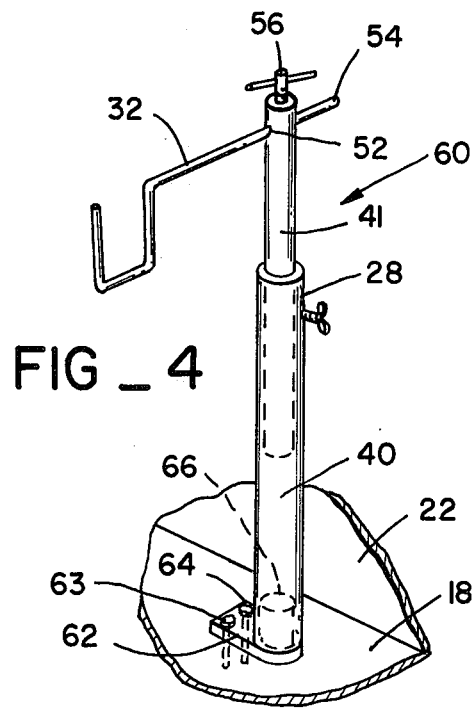
FIG_4

MOTORCYCLE CARRIERS

BACKGROUND OF THE INVENTION

The present invention provides apparatus for restricting the motion of a motorcycle while it is being carried on the bed of a pickup truck or similar vehicle.

The use of motorcycles for off-the-road recreation in areas remote from population centers has become extremely popular. Motorcycles designed for such off-the-road use are not well adapted for riding on commercial roadways, and it is usually not feasible to drive the motorcycles themselves to the area in which they are to be used. Rather, such off-the-road motorcycles are usually hauled on specially designed trailers or on the beds of pickup trucks or similar vehicles and off-loaded at the site where they are to be used. After such use, they are again loaded onto the trucks or trailers and returned to where they are stored.

The common practice when the motorcycles are hauled on the back of pickup trucks to and from the site where they are used is to strap them in position using ropes or stretch cords each time the motorcycles are loaded on the trucks. If permanent mounting brackets were attached to the truck bed, the truck could not be used for many other purposes such as in the hauling of a camper shell and thus such special mounting features are not ordinarily used. Conventional permanent mounting brackets are too large and cumbersome to be installed and replaced each time the truck is used to carry motorcycles. However, when the motorcycles are merely strapped to the bed of the pickup truck, they often come loose and the motorcycles can be damaged in transit.

SUMMARY OF THE INVENTION

The present invention provides an apparatus for restricting the motion of a motorcycle as it is being carried by a pickup truck or similar vehicle. Such vehicles are of the type having a bed which includes a horizontal load-bearing portion and one or more sidewall portions. The motorcycle is provided with a luggage rack or similar rear-mounted load carrying member. The apparatus of the present invention provides a substantially vertical strut mounted to the vehicle bed proximate one of its sidewalls. A transverse hook member is attached to the top of the vertical strut. The free end of the hook member has an upwardly opening hook contour. The rear portion of the motorcycle is lifted and the rear-mounted load carrying member engaged with the hook contour along the side of the motorcycle near the strut. The rear wheel of the motorcycle is thus maintained in a raised position relative to the horizontal portion of the vehicle bed, and the lower extremity of the rear wheel is biased against the vertical strut. The front wheel of the motorcycle is turned against a sidewall portion of the vehicle bed and locked in position and movement of the motorcycle is prevented as it is being carried by the vehicle.

The apparatus of the present invention allows the motorcycle to be quickly fixed in position on the bed of the pickup truck for carrying it to and from the place where it is used. The mounting system not only restricts movement of the motorcycle as it is carried, but also prevents the motorcycle from coming loose during transit so that the motorcycle will not be damaged. However, the apparatus of the present invention is dissimilar from conventional mounting brackets in that it represents a relatively small obstruction which is located proximate the sidewalls of the truck bed and therefore does not materially interfere with the use of the truck in other applications. If the apparatus does interfere with any such use, the apparatus can easily be removed and replaced when desired.

The novel features which are believed to be characteristic of the invention, both as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the apparatus of the present invention used on a pickup truck to restrict the motion of a motorcycle loaded thereon;

FIG. 2 is an enlarged fragmentary view of the apparatus of the present invention illustrated in FIG. 1;

FIG. 3 is a sectional view taken along lines 3—3 of FIG. 2;

FIG. 4 is a perspective view of an alternate embodiment of the apparatus of the present invention.

DESCRIPTION OF THE PREFERRED EMBODIMENT

The manner in which embodiment 10 of the apparatus of the present invention is used to restrict the movement of a motorcycle 12 located on the back of a pickup truck 14 is illustrated by way of reference to FIG. 1. Pickup truck 14 has a conventional configuration which includes a bed 16 including a horizontal load-bearing portion 18 and sidewalls 20-22. Motorcycle 12 is loaded onto bed 16 and rests on the horizontal portion 18 thereof.

Motorcycle 12 is provided with a luggage rack 24 mounted over its rear wheel 26. As will become more apparent hereinafter, it is essential that a rear-mounted load carrying member such as luggage rack 24 be provided on motorcycle 12 for use with the apparatus of the present invention. However, if the motorcycle does not include a luggage rack such as 24, a loop can be attached to the motorcycle, or another structural member at the aft portion of the motorcycle used as a load carrying member.

The embodiment of apparatus 10 of the present invention illustrated in FIG. 1 includes a generally vertical strut 28 mounted to a sidewall portion 22 of vehicle bed 16 by bracket 30 (See FIG. 2). A hook member 32 is transversely mounted to the upper end of vertical strut 28. The free end of hook member 32 is provided with an upwardly opening hook contour 34.

As is apparent from viewing FIG. 1, motorcycle 12 is fixed in position on truck bed 16 by raising the rear portion of the motorcycle and engaging luggage rack 24 with the upwardly opening hook contour 34 of apparatus 10. Rear wheel 26 is maintained a preselected distance "$d$" above the horizontal portion 18 of bed 16 by hook member 32. Luggage rack 24 is engaged on the side thereof adjacent apparatus 10 so that the lower portion of rear wheel 26 is biased against vertical strut 28. The front wheel 36 of motorcycle 12 is turned toward the adjacent sidewall 22 and locked in position.

Most motorcycles are provided with a front fork lock so that the front wheel can easily be locked in the turned configuration. As a result, the front wheel 36 of motorcycle 12 will be wedged against the horizontal portion 18 and sidewall portion 22 of truck bed 16, and movement of the motorcycle will be prevented.

The embodiment 10 of the apparatus of the present invention depicted in FIG. 1 is illustrated in more detail by way of reference to FIGS. 2 and 3. Vertical strut 28 consists of a pair of telescoping members 40, 41. Lower telescoping member 40 is mounted to the sidewall portion 22 of the truck bed by brackets 30. Hook member 32 is attached to upper telescoping member 41 so that the hook member is vertically adjustable, as discussed in more detail hereinafter.

As illustrated by way of reference to FIGS. 2 and 3 in combination, bracket 30 includes a plate 42 bolted to the sidewall portion 22 of the truck bed by bolts 43, 44. A U-shaped bracket member 46 partially circumscribes the outer circumference of lower telescoping member 40, and attaches to plate 42 by bolts 47, 48 to fix lower telescoping member 40 to the sidewall 22 of the truck bed. L-shaped angles 49, 50 can also be attached to bracket 42 to fix lower telescoping member 40 in position. If desired, apparatus 10 can easily be removed from truck bed 22 by loosening bolts 47, 48 and detaching bracket member 46. Even if apparatus 10 is not removed, it represents a relatively small obstruction located adjacent one of the sidewalls of the truck bed and thus will not usually interfere with normal usage of pickup 14.

Referring back to FIG. 2, upper telescoping member 41 can be adjusted vertically relative to lower telescoping member 40. When hook member 32 is located at the desired elevation above the horizontal portion of the truck bed, set screw 50 can be engaged to fix the relative positions of telescoping members 40, 41. This adjustment of the height of vertical member 28 allows the adjustment of apparatus 10 to accommodate different size motorcycles.

The upper end of upper telescoping member 41 is provided with an aperture 52. One end 54 of hook member 32 passes through aperture 52 so that the hook member can be moved transversely with respect to vertical strut 28. When the upwardly opening hook contour 34 at the free end of hook member 32 is located a preselected distance from vertical strut 28, the position of hook member 32 is fixed by engaging set screw 56. Thus, not only the vertical position of hook member 32 but also the transverse location of upwardly opening hook contour 34 is adjustable to accommodate motorcycles having various sizes and configurations.

An alternate embodiment of the present invention is illustrated by way of reference to FIG. 4. Features of this embodiment similar to those of the previously illustrated embodiment are identified with identical reference numerals. In embodiment 60, a mounting bracket 62 is fixed to the horizontal portion 18 of the truck bed adjacent one of the sidewall portions thereof by dowel pins 63, 64. Bracket 62 includes an upwardly directed stud portion 66. The lower member 40 of telescoping strut 28 is hollow and stud 66 is adapted to conform to the hollow interior of the member. STrut 28 can thus be mounted to the horizontal portion 18 of the truck bed by merely slipping lower telescoping member 40 over stud 66 to fix the apparatus 60 in position.

In either embodiment 10 or embodiment 60 of the present invention, the vertical strut 28 thereof is located adjacent one of the sidewalls of the truck bed. The hook member 32 extends outwardly over the horizontal portion of truck bed so that the rear of the motorcycle can be lifted and a luggage rack or other load carrying member on the side of the motorcycle adjacent the apparatus engaged by the hook member. In this manner, the rear wheel of the motorcycle is maintained in a raised position relative to the horizontal portion of the truck bed and is biased against vertical strut 28. The front wheel of the motorcycle is turned against the sidewall of the vehicle and locked in position so that the vehicle will not move and be damaged during the transportation thereof.

While preferred embodiments of the present invention have been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. Apparatus for restricting the motion of a motorcycle carried by a pickup truck or similar vehicle which has a bed including a horizontal portion and at least one sidewall portion wherein the motorcycle is positioned with both wheels adjacent a sidewall and is provided with a rear-mounted hook-receiving member which is affixed to the motorcycle laterally off center, said apparatus comprising in combination, a mounting bracket affixed to said bed and including an upwardly directed stud portion, a substantially vertical hollow strut including mutually telescoping first and second members, said first telescoping member being removably mounted to said bed by slipping over said stud portion and the said second telescoping member being mounted relatively above said first telescoping member in overlapping telescoping relationship, means for fixing the vertical position of said second telescoping member relative to said first telescoping member, a transverse hook member slidably attached to the top of said second telescoping member adjacent and having an upwardly opening hook contour at the other end and means for adjusting the lateral position of said transverse hook member, so that the rear portion of the motorcycle can be lifted and the rearmounted hook receiving member thereof engaged with the hook contour of the transverse hook member to suspend the rear wheel of the motorcycle in a raised position relative to the horizontal portion of the vehicle bed so that the weight of the motorcycle causes the rear wheel to swing laterally toward and remain biased against the vertical strut, and the front wheel of the motorcycle can be turned against the sidewall and locked in position to restrict the motion of the motorcycle as it is being carried by the vehicle.

* * * * *